US012637030B2

(12) United States Patent
Alcaide Hernández et al.

(10) Patent No.: US 12,637,030 B2
(45) Date of Patent: May 26, 2026

(54) FLUID EJECTION SYSTEM FOR EJECTING A CLEANING FLUID TOWARD AN OPTICAL SURFACE

(71) Applicant: Fico Transpar, S.A., Barcelona (ES)

(72) Inventors: Olallo Alcaide Hernández, Viladecavalls (ES); Jose Luis Villarubia Guarino, Viladecavalls (ES); Sergi Civil Pauli, Viladecavalls (ES)

(73) Assignee: FICO TRANSPAR, S.A., Barcelona (ES)

( * ) Notice: Subject to any disclaimer, the term of this patent is extended or adjusted under 35 U.S.C. 154(b) by 298 days.

(21) Appl. No.: 17/857,251

(22) Filed: Jul. 5, 2022

(65) Prior Publication Data

US 2022/0332289 A1 Oct. 20, 2022

Related U.S. Application Data

(63) Continuation-in-part of application No. 16/932,493, filed on Jul. 17, 2020, now Pat. No. 11,378,200.

(51) Int. Cl.
B60S 1/52 (2006.01)
B05B 1/30 (2006.01)
(Continued)

(52) U.S. Cl.
CPC .............. B60S 1/52 (2013.01); B05B 1/3053 (2013.01); B60S 1/54 (2013.01); B60S 1/56 (2013.01)

(58) Field of Classification Search
CPC ............. B60S 1/52; B60S 1/56; B05B 1/3053
See application file for complete search history.

(56) References Cited

U.S. PATENT DOCUMENTS

| 4,575,009 A | 3/1986 | Giraudi |
| 5,086,743 A | 2/1992 | Hickey |

(Continued)

FOREIGN PATENT DOCUMENTS

| CN | 105986864 A | 10/2016 |
| CN | 206017957 U | 3/2017 |

(Continued)

OTHER PUBLICATIONS

Extended European Search Report and Written Opinion for European Application No. 19382615.3; Report Mail Date Jun. 2, 2020; pp. 1-3.

*Primary Examiner* — Eric Keasel
(74) *Attorney, Agent, or Firm* — CANTOR COLBURN LLP

(57) ABSTRACT

A fluid ejection system includes an electromagnetically operated valve for regulating the flow of a fluid. The electromagnetically operated valve includes a valve body defining a fluid inlet and a fluid outlet, a plunger member, an electromagnetic driving means, and a spring adapted to bias the plunger member toward a closed position. The electromagnetic driving means is adapted to drive the plunger member along an open direction inside the valve body and into an open position facilitating the flow of the fluid through the valve body. The electromagnetic driving means includes a coil and a coil reel. The coil is arranged to surround the coil reel, and the coil reel is arranged to surround the plunger member for generating an electromagnetic field suitable for driving the plunger member into the open position. A nozzle is arranged at the fluid outlet for ejecting the cleaning fluid.

10 Claims, 6 Drawing Sheets

(51) Int. Cl.
B60S 1/54 (2006.01)
B60S 1/56 (2006.01)

(56) References Cited

U.S. PATENT DOCUMENTS

| | | | |
|---|---|---|---|
| 5,458,294 | A | 10/1995 | Zachary et al. |
| 6,896,199 | B2 | 5/2005 | Bissonnette |
| 9,217,511 | B2 | 12/2015 | Williams et al. |
| 9,772,630 | B2 | 9/2017 | Yang et al. |
| 10,161,526 | B2 | 12/2018 | Na et al. |
| 10,814,838 | B2 * | 10/2020 | Ina ............................ B60S 1/52 |
| 10,987,681 | B2 * | 4/2021 | Zhao ......................... B60S 1/52 |
| 2006/0214126 | A1 | 9/2006 | Kimble |
| 2006/0220598 | A1 | 10/2006 | Argo et al. |
| 2015/0267837 | A1 | 9/2015 | Vandenplas et al. |
| 2018/0209560 | A1 | 7/2018 | Hwang et al. |

FOREIGN PATENT DOCUMENTS

| | | | | |
|---|---|---|---|---|
| GB | 830394 | A | 3/1960 | |
| GB | 2122920 | A * | 1/1984 | ............ B05B 1/046 |
| WO | 2004085897 | A1 | 10/2004 | |

* cited by examiner

FLUID EJECTION SYSTEM FOR EJECTING A CLEANING FLUID TOWARD AN OPTICAL SURFACE

CROSS-REFERENCE TO RELATED APPLICATIONS

This application is a Continuation-In-Part of U.S. application Ser. No. 16/932,493 filed Jul. 17, 2020, which claims the benefit of European Application Serial No. 19382615.3 filed Jul. 19, 2019, the disclosure of which is incorporated herein by reference in their entirety.

BACKGROUND

The present disclosure refers to an op flow regulation and in particular to electromagnetically operated valves including a valve body and electromagnetic driving means for driving a plunger member along a flow direction for regulating a flow of fluid. The present disclosure also refers to fluid ejection systems comprising said electromagnetically operated valves.

Electromagnetic operated valves are widely known in the art comprising a valve body, electromagnetic driving means, and a plunger member movable by said driving means along a flow direction to operate a closure member relative to a valve seat against pressure of a fluid to enable flow of fluid.

A known electromagnetically operated valve includes an upper valve member loaded by a spring and controlling communication between an air inlet port, connected to a source of compressed air, and an engine port connected to a door engine, and a lower valve member controlling communication between the engine port and an exhaust port and a solenoid secured to the valve. A solenoid plunger is provided to move upwards and downwards to open an air inlet valve and to close an exhaust valve.

A known mechanical valve controls coolant flow, and may be opened and closed by the pressure of a coolant introduced into a coolant inlet. The valve comprises a valve housing having a coolant inlet and a coolant outlet, a valve body in the coolant flow space linearly movable by the flow pressure of the coolant introduced into the coolant inlet, and configured to move by the flow pressure of the coolant to close the coolant outlet, and a support spring disposed at the rear of the valve body in the coolant flow space to elastically support the valve body. A support spring is fitted in a coolant flow space formed in the valve housing.

One drawback of such valves is that the fluid may cause an unauthorized opening of the valve.

SUMMARY

Disclosed in accordance with a non-limiting example is a fluid ejection system adapted to eject a cleaning fluid toward an optical surface of a motor vehicle. The fluid ejection system includes an electromagnetically operated valve for regulating the flow of a fluid. The electromagnetically operated valve includes a valve body defining a fluid inlet and a fluid outlet, a plunger member, an electromagnetic driving means, and a spring adapted to bias the plunger member toward a closed position. The electromagnetic driving means is adapted to drive the plunger member along an open direction inside the valve body and into an open position facilitating the flow of the fluid through the valve body. The electromagnetic driving means includes a coil and a coil reel. The coil is arranged to surround the coil reel, and the coil reel is arranged to surround the plunger member for generating an electromagnetic field suitable for driving the plunger member into the open position. A nozzle is arranged at the fluid outlet for ejecting the cleaning fluid.

In addition to one or more of the features described herein the cleaning fluid is one of air and washing liquid, and wherein a fluid pressure of the cleaning fluid is between about 1.0 bar and 10 Bar.

In addition to one or more of the features described herein the nozzle and the electromagnetically operated valve form a single unit.

In addition to one or more of the features described herein the electromagnetically operated valve includes a coil reel, and the nozzle is directly attached to the coil reel.

In addition to one or more of the features described herein the electromagnetically operated valve includes a coil shielding and a housing of the valve body disposed radially outward from the coil shielding, and the nozzle is directly attached to the housing.

In addition to one or more of the features described herein the electromagnetically operated valve includes a coil reel and a coil shielding at least in part spaced radially outward from the coil reel, and the nozzle is directly attached to at least one of the coil reel and the coil shielding.

In addition to one or more of the features described herein the electromagnetically operated valve includes a coil reel, and the nozzle is an integral and unitary part of the coil reel.

In addition to one or more of the features described herein the nozzle ejects the cleaning fluid at an angle of between 60° and 105° to the flow direction inside the valve body, preferably, at an angle of between 60° and 75°.

In addition to one or more of the features described herein a first outlet of the nozzle has a section between 0.19 and 4.9 square millimeters.

In addition to one or more of the features described herein the size of the fluid inlet of the electromagnetically operated valve is at least 1.5 greater than a first outlet of the nozzle.

In addition to one or more of the features described herein the electromagnetic driving means is configured to adjust an electromagnetic force applied to the plunger member and depending on a pressure of the fluid entering the valve body.

In addition to one or more of the features described herein the plunger member includes at least one of an inner channel and an external channel having at least one plunger member fluid inlet and at least one plunger member fluid outlet for the passage of the cleaning fluid therethrough.

In addition to one or more of the features described herein a plurality of guide rails is adapted to guide the plunger member as the plunger member is driven inside the valve body along a fluid flow direction.

In addition to one or more of the features described herein the cleaning fluid is at least one of compressed air and pressurized cleaning liquid.

Disclosed in accordance with another non-limiting example, is an optical surface cleaning system including an optical surface and a cleaning fluid ejection system adapted to eject a cleaning fluid toward the optical surface. The cleaning fluid ejection system includes an electromagnetically operated valve for regulating the flow of a cleaning fluid. The electromagnetically operated valve includes a valve body defining a fluid inlet and a fluid outlet, a plunger member, an electromagnetic driving means, and a spring adapted to bias the plunger member toward a closed position. The electromagnetic driving means is adapted to drive the plunger member along an open direction inside the valve body and into the open position facilitating the flow of the fluid through the valve body. A nozzle is arranged at the fluid outlet for ejecting the cleaning fluid toward the optical surface.

In addition to one or more of the features described herein a fluid pressure of the cleaning fluid is between about 0.7 and 10 Bar.

In addition to one or more of the features described herein the nozzle and the electromagnetically operated valve form a single unit.

In addition to one or more of the features described herein the nozzle ejects the fluid at an angle of between 60° and 105° to the flow direction inside the valve body, preferably, at an angle of between 60° and 75°.

In addition to one or more of the features described herein the optical surface defines an optical axis (O), wherein the flow direction inside the electromagnetically operated valve and the optical axis (O) form an angle of 90° or less.

In addition to one or more of the features described herein the cleaning optical system comprises an optical device having the optical surface, wherein the optical device is an image acquisition unit configured to acquire a captured image wherein the cleaning fluid ejection system is spaced apart in the radial direction in respect of the optical axis (O) and if further arranged out of the field of view.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
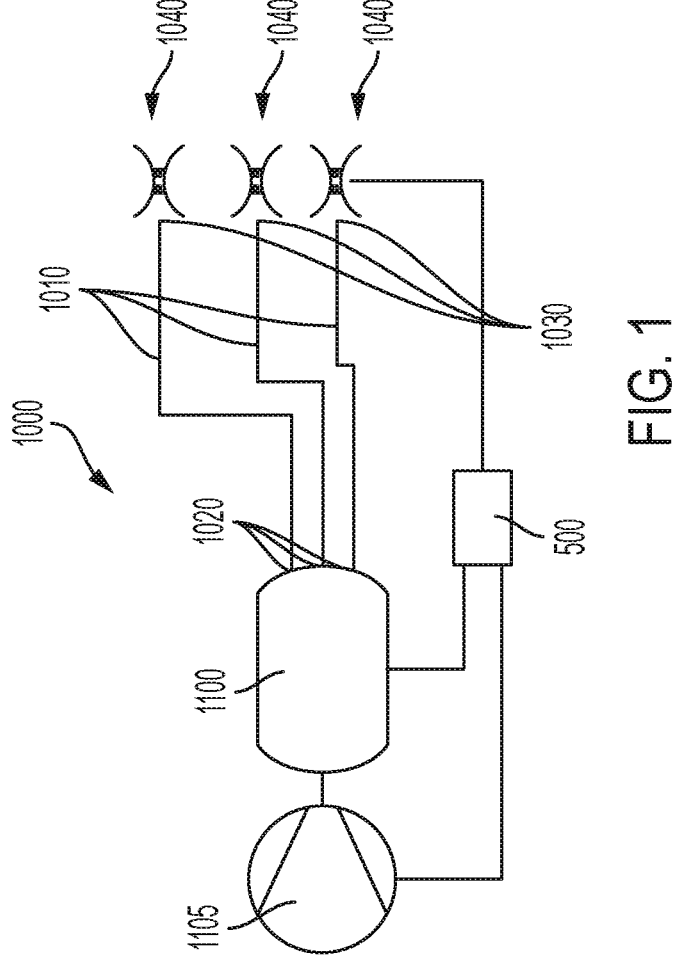
FIG. 1 is a diagram of the present fluid ejection system.

FIG. 1 shows a diagram illustrating one exemplary layout of a fluid ejection system 1000. The fluid ejection system 1000 in the example shown comprises a number of fluid ducts 1010 through which pressurized fluid F can flow. One example to which the present fluid ejection system 1000 may be applied is devices for cleaning optical surfaces in motor vehicles being the fluid F air or washing liquid. Other different applications and fluids are not ruled out.

Fluid ducts 1010 each having one duct inlet 1020 and one duct outlet 1030 are provided for receiving fluid F from a source 1100 of pressurized fluid F, i.e., a compressed-fluid tank or directly from a fluid compressor. In a non-limiting example, the compressed-fluid tank 1100 containing fluid F, such as air, under a pressure of between about 1.0 bar and about 10 bar from fluid compressor 1105. In another non-limiting example, the pressure may be between about 1.0 bar to about 8 bar. In yet another non-limiting example, the pressure may be between about 1.0 bar and about 5 bar. In still yet another non-limiting example, the pressure may be between about 1.0 bar and about 3 bar. Although one source of pressurized fluid 1100 has been illustrated in FIG. 1, a number of sources of pressurized fluid 1100 may be provided for feeding one or more fluid ducts 1010.

The duct outlet 1030 is arranged at one free end of each air duct 1010 for discharging fluid F to the outside through a nozzle 1040. Fluid pressure at the duct inlet 1020 is of the order of 1-10 bar. Fluid ducts 1010 are thus all pressurized until reaching nozzles 1040. The electromagnetically operated valves 100 shown in FIGS. 2 and 3 of the drawings are included in the nozzles 1040 forming electromagnetically operated valve devices.

A control means 500 is also provided for controlling a state of an electromagnetically operated valve 100 that serves the purpose of regulating fluid flow through fluid ducts 1010.

The above mentioned control means 500 may be any intelligent control means such as an electronic control unit (ECU), as shown in FIG. 1, for controlling a status of the electromagnetically operated valves 100 in response to one or more sensing elements such as a dirt sensor, etc. However, the control means 500 may be a manual actuator to control the operation of the electromagnetically operated valve 100 as desired by the user or operator. Control means 500 may also include a hybrid design including intelligent control and a manual override selection.

Figures 2, 3:
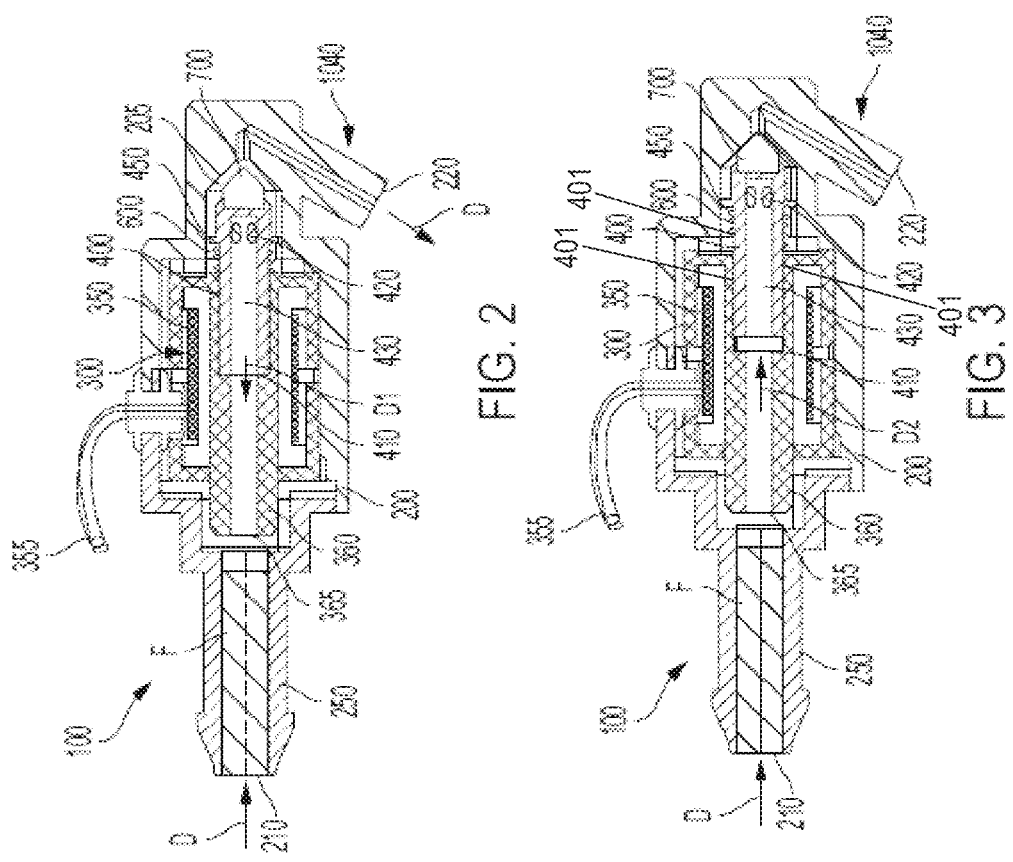
FIG. 2 is cross sectional view of a nozzle and an electromagnetically operated valve of the fluid ejection system shown in an open position.
FIG. 3 is a cross sectional view of the nozzle and the electromagnetically operated valve shown in a closed position.

Now referring to FIGS. 2 and 3 of the drawings, a first example of the electromagnetically operated valve 100 is shown comprising a valve body 200 having a valve inlet 210 leading to an inlet section 250 and a valve outlet 205 leading to a corresponding nozzle 1040 having a nozzle outlet 220, shown in FIG. 1. A mobile core or plunger member 400 movable through the inside of the valve body 200 is also provided. In the example shown, the plunger member 400 has a diameter of and about 2-8 mm and is 5-10 mm long. Other sizes are of course possible.

The plunger member 400 is driven by electromagnetic driving means 300 along a flow direction D inside the valve body 200 along an open direction D1 to the left in FIG. 2 opposed to the fluid flow, as it will be explained below. As stated above, nozzles 1040 are directly attached to the valve body 200 forming a single unit.

Still referring to FIGS. 2 and 3 of the drawings, the electromagnetic driving means 300 in the example shown comprises a coil 350 that is arranged surrounding a fixed core or ferromagnetic ring 360. The ferromagnetic ring 360 is in turn arranged surrounding the plunger member 400. The ferromagnetic ring 360 has a ring inlet 365 fluidly connected to the valve inlet 210. As the coil 350 is energized through power supply line 355 an electromagnetic field is generated. Such electromagnetic field is suitable for causing a magnetic force, for example of the order of 5-25 N, greater than that of the fluid F, to drive the plunger member 400 along the open direction D1 to the left in FIG. 2 as described above, along flow direction D, in the opposite direction to that of the fluid flow. This causes the plunger member 400 to move into an open position shown in FIG. 2 in which fluid F is allowed to flow through the valve body 200 into the nozzle outlet 220. As the coil 350 is not energized, the electromagnetic field ceases and the plunger member 400 is driven by the pressure of fluid F that flows inside the valve body 200 along the closed direction D2, to the right in FIG. 3 as a result of which fluid F is prevented from flowing into the nozzle 1040 and through the nozzle outlet 220. The plunger member 400 may be partially hollow with an inner channel 430 defined therein.

A plunger member fluid inlet 410 is fluidly connected to said ring inlet 365 and a number of plunger member fluid outlets 420 radially distributed are provided in the plunger member 400. Fluid F may be thus allowed to flow from the plunger member fluid inlet 410 to the plunger member fluid outlets 420 along flow direction D towards valve outlet 205 to be delivered through the nozzle outlets 220 of the nozzles 1040. While fluid outlets 420 are shown as being radially distributed about plunger member 400, other structure, hollow areas formed on plunger member 400 or one or more axially extending channels may be also be employed.

Figure 4:
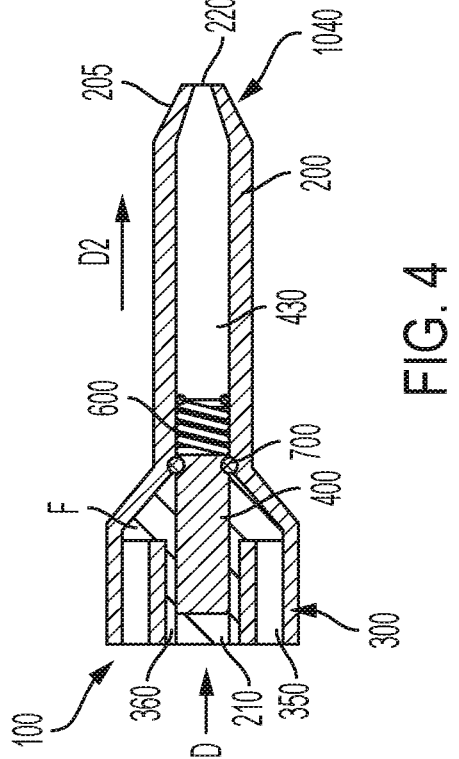
FIG. 4 is a cross sectional view of a second embodiment of the nozzle and the electromagnetically operated valve shown in an open position.
Figure 5:
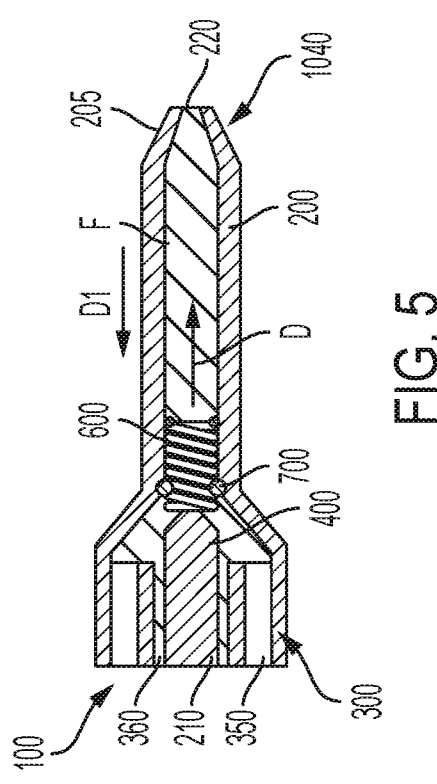
FIG. 5 is a cross sectional view of the nozzle and the electromagnetically operated valve in FIG. 4, but shown in a closed position.

In a second example, the plunger member 400 is solid as shown in FIGS. 4 and 5 of the drawings. In use, in said second example, since the plunger member 400 is solid, the fluid F flows around the plunger member 400 and even may flow around the ferromagnetic ring 360. As in the first example, with the coil 350 not being energized, the plunger member 400 is driven by the pressure of fluid F that flows inside the valve body 200 along the closed direction D2, to the right in figure, as a result of which fluid F is prevented from flowing into the nozzle outlet 220, and with the coil 350 being energized, the plunger member 400 is driven by the generated magnetic field along the open direction D1, to the left in figure, as a result of which fluid F is allowed to flow around the plunger member 400 and it may be also allowed to flow around the ferromagnetic ring 360 into the valve outlet 205 to be ejected out through the nozzle outlet 220 of the nozzle 1040.

A leak-proof sealing cap 700 is provided to close the valve body 200. Thus, in the open position of the electromagnetically operated valve 100 shown in FIG. 2, the sealing cap 700 is separated from a valve outlet 205 defined by an interior of the valve body 200 allowing fluid F to flow towards the nozzle outlet 220. In the closed position of the electromagnetically operated valve 100 shown in FIG. 3, the sealing cap 700 abuts interior of the valve body 200 that defines the valve outlet 205 preventing fluid F from flowing towards the nozzle outlet 220.

In FIGS. 2 and 3, a preloaded compression closing spring 600 is provided inside the valve body 200 to bias the plunger member 400. Specifically, the closing spring 600 is arranged surrounding the plunger element 400 and more particularly the closing spring 600 is arranged between the ferromagnetic ring 360 and ribs 450 formed in the plunger member 400. The closing spring 600 is capable of providing a spring force of about 1-10 N in the same direction as the pressure of fluid F flowing inside the valve body 200. The force that can be applied by the coil 350 when energized is thus greater than the force of the closing spring 600 plus the force of the fluid F flowing through the valve body 200. In operation, the closing spring 600 is more extended in the closed position than in the open position biasing the plunger member 400 along the same direction D1 as that of the fluid flow direction D to keep the plunger member 400 in a closed position, shown in FIG. 3, even when not enough or no incoming fluid pressure exists.

An opening spring 600', shown in FIGS. 4 and 5, may be alternatively provided inside the valve body 200 to bias the plunger member 400 along a direction D1 opposite to that of the fluid flow direction D to counteract the force of the pressurized fluid F flowing through the valve body 200. As a result, high forces are not required to be applied to open the valve outlet 205. Said opening spring 600' is more extended in the open position than in the closed position. Biasing force of said opening spring 600' is lower than a fluid pressure such that the plunger member 400 is always kept in a closed position by pressurized fluid. In particular, the force that can be applied by the coil 350 when energized is thus greater than the force of the fluid F flowing through the valve body 200 minus the force of the opening spring 600'.

As a result, a magnetic force required to drive the plunger member 400 along the open direction D1 is reduced.

The plunger member 400 is guided by guide rails 401 as it is driven inside the valve body 200 along flow direction D according to open and closed directions D1, D2 through the use of the above mentioned ribs 450 formed in the plunger member 400. Also, the plunger member 400 is guided in use through an inner surface of the ferromagnetic ring 360 and an exterior surface of the plunger member 400 itself as shown in FIG. 3 such that the plunger member 400 is centered inside the valve body 200 during use.

Figures 6, 7:
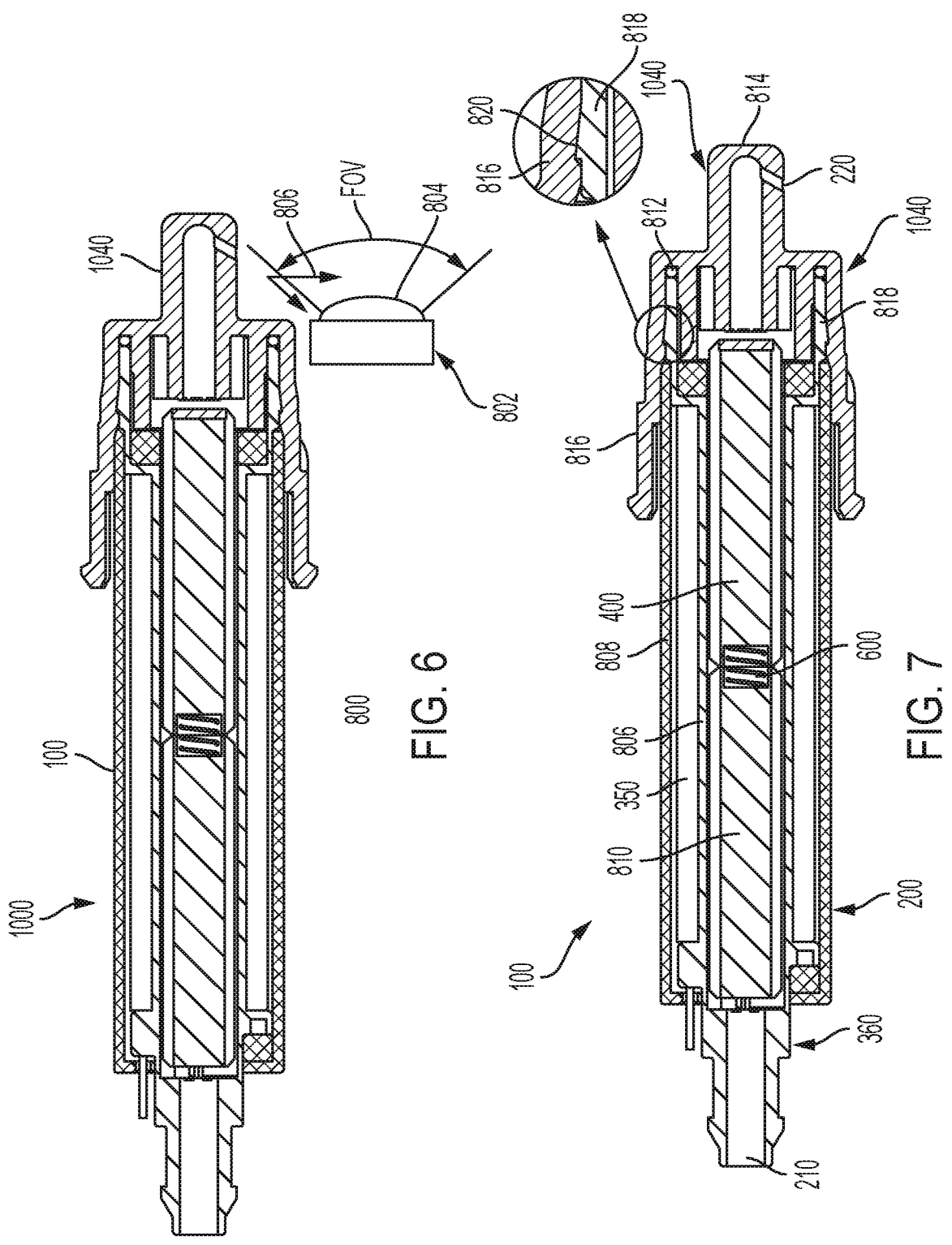
FIG. 6 is a schematic of a self-cleaning optical system of the present disclosure including the fluid ejection system and an optical device having an optical surface cleaned by the fluid ejection system.
FIG. 7 is a cross sectional view of a third embodiment of the nozzle and the electromagnetically operated valve of the fluid ejection system.

Referring to FIG. 6, an optical surface cleaning system 800 includes the cleaning fluid injection system 1000 and an optical surface 804 (e.g., lens) to be cleaned. Optical surface 804 may be part of an optical device 802 having an optical axis. As previously described, the cleaning fluid injection system 1000 includes an electromagnetically operated valve 100 and a nozzle 1040 through which a cleaning fluid 806 (see arrows) is sprayed upon the optical surface 804. In the non-limiting example shown, valve 100 includes a longitudinal or valve axis that is substantially parallel to the optical axis, e.g., the axis that extends through the center of the FOV. However, it should be understood that the valve axis could be at an angle, such as about 15° relative to the optical axis.

In a non-limiting example, nozzle 1040 directs cleaning fluid 806 outwardly at an angle of between about 60° and about 135° relative to a longitudinal axis of valve 100. In another non-limiting example, nozzle 1040 directs cleaning fluid 806 outwardly at an angle of between 60° and about 105°. In yet another non-limiting example nozzle 1040 directs cleaning fluid 806 outwardly at an angle of between about 60° and about 75°. Further, in a non-limiting example, nozzle outlet 220 of nozzle 1040 includes a section between about 0.19-mm$^2$ and 4.9-mm$^2$. In another non-limiting example, nozzle outlet includes a section between 0.19 mm$^2$ and 1.8 mm$^2$. In a non-limiting example, valve outlet 205 is about 1.5 times greater than nozzle outlet 220. At this point while shown as having a fixed length, nozzle 1040 may be axially adjustable.

Referring to FIG. 7, a third embodiment of both the electromagnetically operated valve 100 and nozzle 1040 is illustrated. The valve 100 includes a coil reel 806, shielding 808, a fixed core 810, the coil 350, the mobile core 400 (i.e., plunger member), the spring 600, and a seal 812. In a non-limiting example, shielding 808 is formed from a metal in order to block electromagnetic energy and coil reel 806 is formed from non-magnetic material. The shielding 808 and portions of the coil reel 806 are part of the valve body 200 previously described.

The spring 600 is axially located between, and biased between, the fixed core 810 and the mobile core 400. The coil reel 806 is located radially outward from, and circumferentially wraps about the cores 810, 350, 400. The coil 350 is located radially outward from, and in-part axially aligned to, the coil reel 806. The shielding 808 is located radially outward from, and in-part axially aligned to, the coil 350.

The nozzle 1040 in FIG. 7 includes a base body 814 that defines the nozzle outlet 220 and a collar 816 that projects axially to attach to a sleeve portion 818 of the coil reel 806. The sleeve portion 818 is axially displaced from the coil 350. The collar 816 is disposed outward from, and is adapted to axially overlap, the sleeve portion 818. When assembled, the sleeve portion 818 of the coil reel 806 is directly attached to the collar 816 of the nozzle 1040 via a snap-fit connection 820 radially carried there-between. When assembled, seal 812 is resiliently compressed axially between the nozzle body 814 and a distal end of the sleeve portion 818. In other examples, the nozzle 1040 may be directly attached to the coil reel 806 via adhesive or separate fasteners (not shown).

Figures 8, 9:
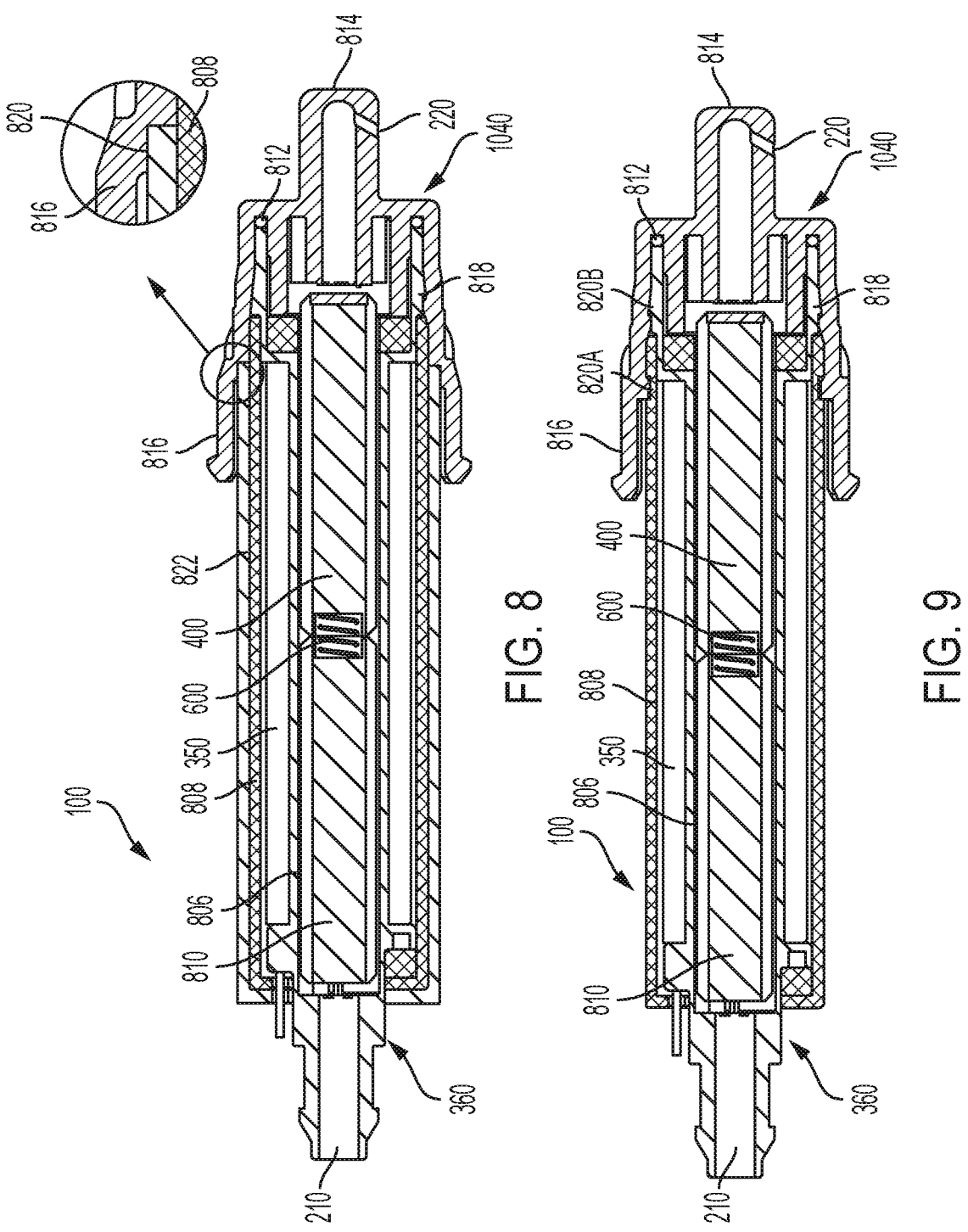
FIG. 8 is a cross sectional view of a fourth embodiment of the nozzle and the electromagnetically operated valve of the fluid ejection system.
FIG. 9 is a cross sectional view of a fifth embodiment of the nozzle and the electromagnetically operated valve of the fluid ejection system.

Referring to FIG. 8, a fourth embodiment of both the electromagnetically operated valve 100 and nozzle 1040 is illustrated. The fourth embodiment is similar to the third embodiment of FIG. 7 except that the fourth embodiment further includes an outer housing 822 that envelopes a portion 824 of the shielding 808 that is axially co-aligned to the coil 350. Also in the fourth embodiment, the connection 820 is located directly radially between the housing 822 and the collar 816. The connection 820 in FIG. 8 is illustrated as a connection utilizing adhesive (not shown), however, in another example the connection may be a press or snap fit, or connected utilizing separate fasteners (not shown).

Referring to FIG. 9, a fifth embodiment of both the electromagnetically operated valve 100 and nozzle 1040 is illustrated. The fifth embodiment is similar to the third embodiment of FIG. 7 except that the fifth embodiment includes two snap-fit connections 820A, 820B spaced axially apart from one-another. The first snap-fit connection 820A is carried directly between the collar 816 and the shielding 808 and the second snap-fit connection 820B is carried directly between the collar 816 and the coil reel 806. In other examples, the snap fit connection may join the nozzle 140 to shielding 808 and/or the nozzle 1040 to shielding 808 and the coil reel 806. Further, it should be understood that the connections may take on a wide variety of forms and could include one or more of snap-fit connections, adhesive connections, and/or the use of mechanical fasteners.

Figure 10:
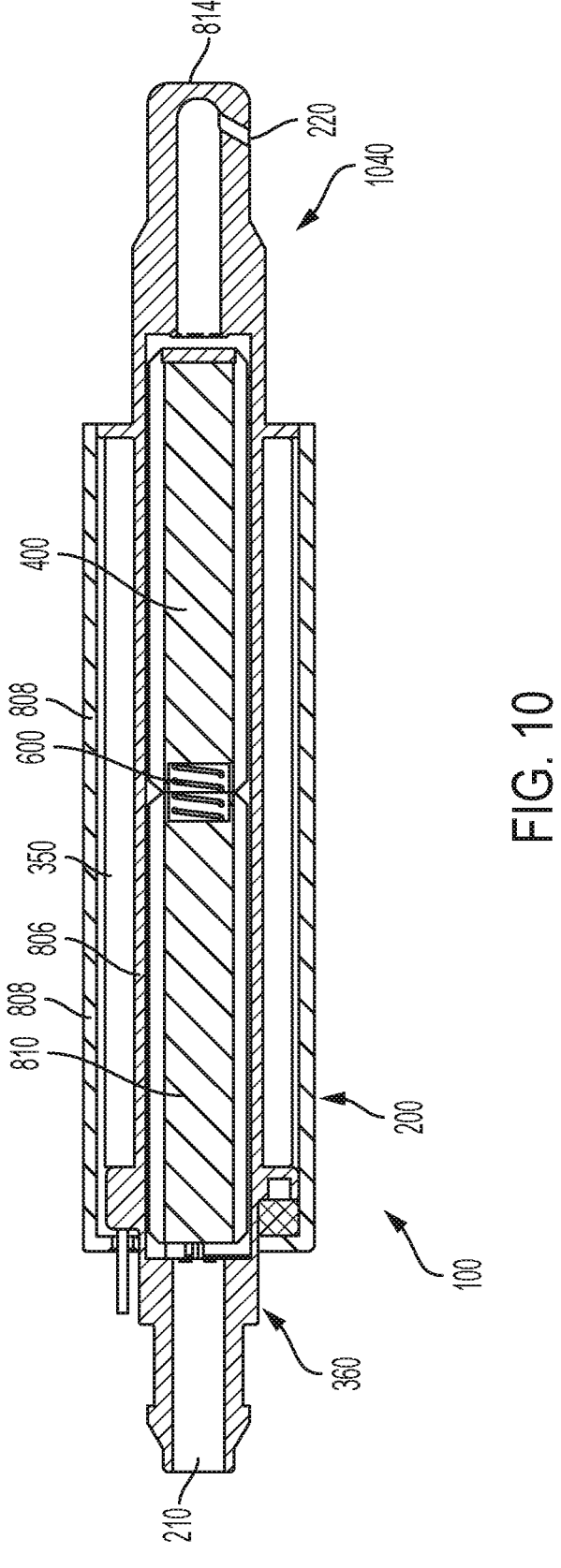
FIG. 10 is a cross sectional view of a sixth embodiment of the nozzle and the electromagnetically operated valve of the fluid ejection system.

Referring to FIG. 10, a sixth embodiment of both the electromagnetically operated valve 100 and nozzle 1040 is illustrated. In this embodiment, the nozzle 1040 is a one-piece, unitary, and homogeneous part with the coil reel 806.

Although only a number of examples have been disclosed herein, other alternatives, modifications, uses and/or equivalents thereof are possible. For example, the coil 350 of the electromagnetic driving means 300 may be located outside of and surrounding valve body 200 This may result in a more compact electromagnetically operated valve 100. In a non-limiting example, an electro-magnetic shield may be disposed outwardly of the coils. Also, while the nozzle is shown as including a single outlet, the number of outlets and the angle of each outlet may vary. Further, the nozzle may be axially adjustable.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

While the present disclosure is described with reference to exemplary embodiments, it will be understood by those skilled in the art that various changes may be made, and equivalents may be substituted without departing from the spirit and scope of the present disclosure. For example, the coil 350 of the electromagnetic driving means 300 may be located outside the valve body 200, surrounding it. This may result in a more compact electromagnetically operated valve 100. In addition, various modifications may be applied to adapt the teachings of the present disclosure to particular situations, applications, and/or materials, without departing from the essential scope thereof. The present disclosure is thus not limited to the particular examples disclosed herein but includes all embodiments falling within the scope of the appended claims.

The invention claimed is:

1. A fluid ejection system adapted to eject a cleaning fluid toward an optical surface, the fluid ejection system comprising:

a fluid duct inside of which a fluid is flowed, the fluid duct having a duct inlet to receive the fluid from a fluid source and a duct outlet to discharge the fluid to the outside;

a nozzle arranged at the duct outlet to eject the fluid to the optical surface; and at least one electromagnetic valve configured to regulate the flow of fluid, the electromagnetically operated valve including;

a valve body, a plunger member, an electromagnetic driving means configured to drive the plunger member along a flow direction inside the valve body into at least an open position in which the fluid is allowed to flow through the valve body and into a closed position in which the fluid is not allowed to flow through the valve body, wherein the plunger member is arranged to be forced by a pressure of fluid into the closed position, and to be driven by the electromagnetic driving means into the open position, and wherein the electromagnetically operated valve is included in the nozzle forming an electromagnetically operated valve device;

wherein the nozzle and the electromagnetically operated valve form a single unit;

wherein the electromagnetically operated valve includes a coil shielding and a housing of the valve body disposed radially outward from the coil shielding, and the nozzle is one of directly attached to and an integral part of the housing.

2. The fluid ejection system set forth in claim 1, wherein the fluid is one of air and washing liquid, and wherein a fluid pressure of the fluid is between about 1.0 bar and 10 Bar.

3. The fluid ejection system set forth in claim 1, wherein the nozzle ejects the cleaning fluid at one of an angle of between 60° and 105° to the flow direction inside the valve body or at an angle of between 60° and 75°.

4. The fluid ejection system set forth in claim 1, wherein a first outlet of the nozzle has a section between 0.19 and 4.9 square millimeters.

5. The fluid ejection system set forth in claim 1, wherein the size of the fluid inlet of the electromagnetically operated valve is at least 1.5 greater than a first outlet of the nozzle.

6. The fluid ejection system set forth in claim 1, wherein the electromagnetic driving means is configured to adjust an electromagnetic force applied to the plunger member depending on a pressure of the fluid entering the valve body.

7. The fluid ejection system set forth in claim 1, wherein the plunger member includes at least one of an inner channel and an external channel having at least one plunger member fluid inlet and at least one plunger member fluid outlet for the passage of the fluid therethrough.

8. The fluid ejection system set forth in claim 1, wherein the fluid is at least one of compressed air and pressurized cleaning liquid.

9. A fluid ejection system adapted to eject a cleaning fluid toward an optical surface, the fluid ejection system comprising:

a fluid duct inside of which a fluid is flowed, the fluid duct having a duct inlet to receive the fluid from a fluid source and a duct outlet to discharge the fluid to the outside;

a nozzle arranged at the duct outlet to eject the fluid to the optical surface; and at least one electromagnetic valve configured to regulate the flow of fluid, the electromagnetically operated valve including:

a valve body, a plunger member, an electromagnetic driving means configured to drive the plunger member along a flow direction inside the valve body into at least an open position in which the fluid is allowed to flow through the valve body and into a closed position in which the fluid is not allowed to flow through the valve body, wherein the plunger member is arranged to be forced by a pressure of fluid into the closed position, and to be driven by the electromagnetic driving means into the open position, and wherein the electromagnetically operated valve is included in the nozzle forming an electromagnetically operated valve device;

wherein the nozzle and the electromagnetically operated valve form a single unit; and wherein the electromagnetically operated valve includes a coil reel, and the nozzle is at least one of directly attached to the coil reel and a unitary part of the coil reel.

10. A fluid ejection system adapted to eject a cleaning fluid toward an optical surface, the fluid ejection system comprising:

a fluid duct inside of which a fluid is flowed, the fluid duct having a duct inlet to receive the fluid from a fluid source and a duct outlet to discharge the fluid to the outside;

a nozzle arranged at the duct outlet to eject the fluid to the optical surface; and at least one electromagnetic valve configured to regulate the flow of fluid, the electromagnetically operated valve including;

a valve body, a plunger member, an electromagnetic driving means configured to drive the plunger member along a flow direction inside the valve body into at least an open position in which the fluid is allowed to flow through the valve body and into a closed position in which the fluid is not allowed to flow through the valve body, wherein the plunger member is arranged to be forced by a pressure of fluid into the closed position, and to be driven by the electromagnetic driving means into the open position, and wherein the electromagnetically operated valve is included in the nozzle forming an electromagnetically operated valve device;

wherein the nozzle and the electromagnetically operated valve form a single unit; and wherein the electromagnetically operated valve includes a coil reel and a coil shielding at least in part spaced radially outward from the coil reel, and the nozzle is one of directly attached to or an integral part of at least one of the coil reel and the coil shielding.

* * * * *